(12) United States Patent
Raven et al.

(10) Patent No.: US 10,604,281 B2
(45) Date of Patent: Mar. 31, 2020

(54) COOPERATIVE SERVICE VALVE FOR SATELLITE MEDIA TRANSFER

(71) Applicant: U.S.A. as represented by the Administrator of the National Aeronautics and Space Administration, Washington, DC (US)

(72) Inventors: Hans Raven, Laurel, MD (US); Matthew Ashmore, Glen Burnie, MD (US); Erich Schulze, Millersville, MD (US)

(73) Assignee: U.S.A. as represented by the Administrator of the National Aeronautics and Space Administration, Washington, DC (US)

( * ) Notice: Subject to any disclaimer, the term of this patent is extended or adjusted under 35 U.S.C. 154(b) by 378 days.

(21) Appl. No.: 15/280,280

(22) Filed: Sep. 29, 2016

(65) Prior Publication Data

US 2018/0087683 A1  Mar. 29, 2018

(51) Int. Cl.
  *B64G 1/64*  (2006.01)
  *F16L 1/00*  (2006.01)
(52) U.S. Cl.
  CPC ............... *B64G 1/641* (2013.01); *F16L 1/00* (2013.01)
(58) Field of Classification Search
  CPC ...... Y10T 137/88046; Y10T 137/8803; B64G 1/641; F16L 37/44; F16L 37/47
  USPC .............. 137/614.17, 614.19; 251/149.5; 141/293–295, 348–350
  See application file for complete search history.

(56) References Cited

U.S. PATENT DOCUMENTS

| | | | |
|---|---|---|---|
| 5,107,891 A * | 4/1992 | Abe ..................... | B23K 37/006 137/456 |
| 7,063,328 B2 * | 6/2006 | Smith, III ................. | F16L 1/26 277/607 |
| 8,689,828 B2 * | 4/2014 | Smith, III ............. | F16K 17/168 137/614.04 |
| 2013/0220482 A1 * | 8/2013 | Fuhrig .................... | B65B 31/00 141/18 |

* cited by examiner

*Primary Examiner* — Michael R Reid
(74) *Attorney, Agent, or Firm* — Matthew F. Johnston; Bryan A. Geurts

(57) ABSTRACT

A Cooperative Service Valve includes a fitting connected to a valve body via a tube, a stem configured to fit within the valve body. The stem includes a stem first end having a first seal and configured to movably fit within a tube first end, a sealing portion connected to the stem first end and configured, in a first position, to provide a second seal between the sealing portion and an inner surface of the stem body, a fluid flow portion comprising openings for allowing liquid or gaseous media to pass through the Cooperative Service Valve when the stem is in a second position and a stem second end configured to secure a poppet guide, a poppet and a spring associated with the poppet that biases the poppet against a seal to yield a third seal. The first, second and third seals open and close in a particular order to allow or prevent fluid from flowing through the stem.

13 Claims, 13 Drawing Sheets

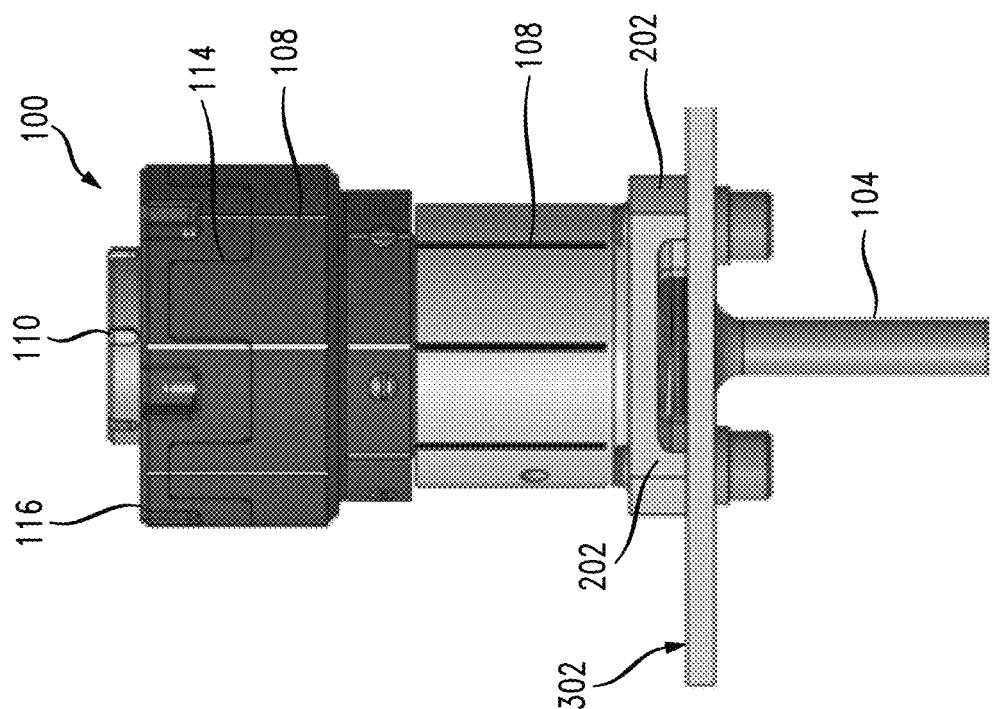
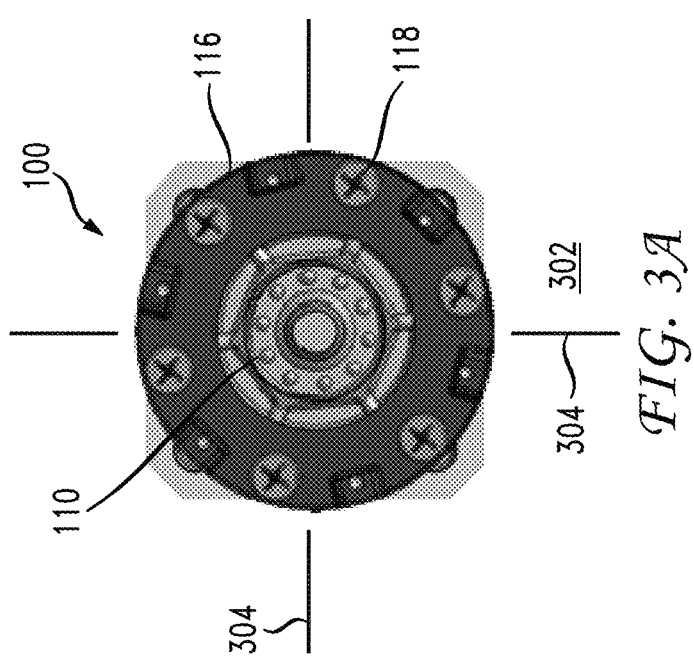

COOPERATIVE SERVICE VALVE FOR SATELLITE MEDIA TRANSFER

BACKGROUND

1. Technical Field

The present disclosure relates to fueling a system and more specifically to a Cooperative Service Valve that provides for robotic and human compatible transfer of liquid and gaseous media, such as propellants, pressurants, coolants or life-support fluids, between assets whether on orbit or on earth and can apply to robotic or manual operation.

2. Introduction

Satellites have for many years been built with the concept that once they are brought into orbit, they would have a certain supply of fuel that, when depleted, would not be replenished and the satellite would be abandoned. Thus, a potential, and likely, end-of-life event for a satellite is the depletion of propellant. Historically, satellites which consume all of their launched propellant, but whose hardware and software components are otherwise still functioning properly, will be decommissioned or de-orbited because the lack of onboard propellant does not permit proper spacecraft attitude and navigational control. The primary means to transfer fuel into a satellite's propulsion system is through what are called Fill and Drain Valves (FDVs). What follows is a description of the various structural issues surrounding the use of FDVs which illustrate the need for an improved system for engaging with and providing media to a device like a satellite.

The primary interface for the transfer of media, such as propellants and pressurants, to a device like a satellite is the FDV. Used throughout industry, these interfaces have a number of features that can hamper robotic servicing. These features include but are not limited to the use of non-captive external closeout caps, sometimes referred to as secondary/safety caps and tertiary caps; lack of thermal isolation; lack of a controlled reaction of torque in the absence of a backing wrench; and use of lock wire to prevent backoff of closeout caps and actuation of the valve. There is also a lack of universal layout to these FDVs with respect to the spacecraft bus structure which further exacerbates access to these areas for refueling of non-cooperative satellites. In addition, there is a lack of layout and worksite standardization, and the valves themselves are also not standardized. For example, the cap size and interface, valve size, and actuation method vary between different valve manufacturers. All of these factors add complexity to the refueling (or other media transfer) task. The term refuel is used inclusively as referring to the resupply of propellant and required pressurants or other media that allow a satellite with depleted fuel stores to extend its life.

A particularly difficult disadvantage of currently available FDV's results from the fueling interface not being designed for robotic mating. The FDVs are "non-cooperative" in that they were not designed with on-orbit servicing in mind. Compared to a cooperative servicing interface, non-cooperative interfaces pose unique difficulties and challenges that need addressing. These and other challenges with respect to how one might refuel a satellite are addressed in the present disclosure.

Most FDVs feature a standardized 37 degree, flared fitting end per SAE AS4395, a design that is poorly adapted for use with a robotic system. The fitting ends are threaded which can cause risks in any threading operation such as galling between the mating threads and cross-threading. This risk increases when there is a lack of design control over both sides of the interface and the task is executed robotically and in a dynamic environment. A dynamic environment can be any environment that changes depending on where the media transfer is taking place. In the context of robotic servicing, the change comes from natural oscillations between a Servicing Vehicle and a docked Client as well as from control stability of the robotic arm. In the context of planetary robotic servicing, a change may refer to robot arm stability and atmospheric conditions like wind. In general, a dynamic environment means any relative motion between the media transfer tool and the worksite that makes it difficult for the robot operator (or autonomous control software) to position the tool where commanded.

The use of caps for seal redundancy is a disadvantage. Standard industry FDVs provide redundant means of sealing by using a flared tube cap, such as AN929, with a non-captive, non-reusable conical seal. In some cases, a tertiary cap is used to provide an additional barrier to leakage through the main valve seal or the AN cap. This standard has worked well for ground-based fueling. However, it necessitates additional specialized tools in-orbit to remove, capture, and dispose of these caps and conical seal, which introduces added mission risk and extended operational timelines. Reestablishing seal redundancy after media transfer by re-installing these caps is also extremely risky due to the high risk of galling and cross threading. On-orbit rethreading is only recommended when using a precisely controlled interface whose threads have been designed to prevent galling, eliminate the possibility of cross-threading, and/or ensure perfect alignment prior to thread engagement. As such, one approach for non-cooperative refueling has been to replace the redundant seals created by the various external caps with new controlled hardware, designed to tackle these problems, which acts as a replacement for the removed caps.

While FDVs are an interface used industry-wide for propellant systems in satellites, there is no standardization of form, fit, or function for the interface with the exception of the use of standardized flared fitting ends per SAE AS4395. FDVs cannot universally be swapped out between manufacturers or even from within the same manufacturer's catalogue due to changes in form, fit, or function. This results in the need for a refueling tool system with an adaptable front end that can accommodate a catalogue of FDVs from multiple manufacturers. For example, the use of non-standardized tertiary caps also causes problems for robotic servicing of FDVs. Due to the non-standardized design of tertiary caps, servicing of a non-cooperative satellite requires a unique tool to acquire, capture, remove, and stow the tertiary cap in order to access the FDV for refueling.

A lack of mechanical coupling is a further disadvantage. Most FDVs require thermal isolation in order to properly control the temperature of the FDV along with the propellants present in the FDV. This isolation is accomplished by preventing the mounting structure from acting as a heat sink, because current FDV designs are not inherently thermally isolated. To accomplish this isolation, thermal spacers/washers are used which also result in a poor mechanical and structural coupling between the FDV and the satellite. FDVs are usually poorly mechanically coupled to the surrounding structure, resulting from the need to thermally isolate the FDV from the surrounding structure, because a strong mechanical coupling usually results in strong thermal coupling as well. Consequently, FDVs require the use of backing wrenches during ground operations in order to properly react torques induced by technicians engaging or disengaging the FDVs' seals and caps; failure to employ a backing wrench would cause torques to be reacted into the critical weld joint between the FDV and the spacecraft propulsion system.

Lack of alignment features can create challenges during on-orbit engagement. Currently FDVs do not have intentional alignment features which would facilitate tele-operated acquisition, nor do spacecraft possess alignment aids on or within the surrounding structure. Although it is possible to use existing features and geometry, testing has indicated that dedicated alignment features aid robotic operations, promoting correct orientation of mating interfaces and thus decreasing operation timelines and the possibility of reattempts to correct for misalignments. Further, while some have displayed the ability to interface with current FDVs in-orbit, the fact remains that current FDVs and their respective satellites were never designed to be manipulated in-orbit, nor were they intended to be accessed robotically. The FDV has historically been designed around ground-based use by a human operator wearing personal protective equipment.

Currently available cooperative spacecraft refueling valves are not a direct replacement for the legacy valves. The cooperative valve designed for the Orbital Express mission, for example, is not a direct replacement for a standard FDV. That cooperative valve can be used in lieu of FDVs, but the design, consisting of two integrated valves, has a mass of 2.3 kg and an envelope of 25 cm by 7 cm by 13 cm. For comparison, one standard FDV from a well-known manufacturer has an envelope dimension of 4.75 cm by 7.67 cm and a mass of 150 g. In this example, then, the cooperatively-designed servicing valve assembly requires more than 15 times the mass allocation and a much larger foot print on the spacecraft bus, and is therefore not a direct replacement for a FDV due to changes in form and fit.

The use of a lock wire on current FDVs is also an impediment to robotic servicing. Lock wire is used as a means to prevent caps and actuation nuts from inadvertent loosening during vibration and shock loads experienced during launch. Lock wires need to be severed and manipulated on FDVs prior to establishing access to the FDV in order to transfer propellant. Addressing the lock wire requires use of a specialized tool and an extended operations timeline.

The architecture of current FDVs does not provide the ability to perform ground-based maintenance. Not all FDVs are designed to be a separable assembly, meaning that it does not have the ability to be disassembled to permit servicing or cleaning of its interior components prior to and/or after integration to the spacecraft. They become less serviceable once they are welded and integrated to the spacecraft, where desired maintenance may involve the swapping of failed components that would otherwise force an inseparable FDV to be discarded.

Aside from characteristics intrinsic to the valve itself that introduce difficulty in robotic access and manipulation, current FDV's possess a distinct lack of surface area that could be used for thermal control of the valve. Lack of surface area for active thermal control can be challenging. The majority of FDVs' exterior surfaces contain features to accommodate all of the different interfaces required for fit and function. These interfaces include thread surfaces for tertiary caps, surfaces for standard wrenches (both for actuation and for a backing wrench), holes for lock wires, external O-ring glands, as well as required means of mounting to a structure. The space available on individual FDVs varies, but an available surface area of 5 $cm^2$ is a rough average. This results in a very small area for direct active thermal control when required. As a result, FDV's are usually indirectly thermally controlled by a combination of external, auxiliary thermal blankets and resistive heating elements applied to the surrounding spacecraft structure. These blankets pose a difficult impediment to access to the FDV as they must be robotically removed or pushed aside and restrained before attempting to acquire the valve. Like other non-cooperative features of the valve, blanket removal or restraint necessitates an ensemble of specialized robotic tools to cut, manipulate, and restrain, which introduces mission risk and impacts operational timeline.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

The Cooperative Servicing Valve (CSV) disclosed herein addresses the deficiencies in the prior art mentioned above by offering a redesign of the primary media transfer interface in order to optimize the interface for tele-robotic operated actuation through the use of the robotic fluid transfer tool. NASA's Satellite Servicing Capabilities Office (SSCO), based at the Goddard Space Flight Center (GSFC), has designed and developed the CSV to facilitate on-orbit tele-robotic operated resupplying of media, such as propellants and pressurants, to a cooperative satellite. A "cooperative" satellite is one that is built with structures such as improved fueling valves designed for in-orbit refueling. Other aspects that apply in addition to cooperative satellite refueling include robot and human compatible transferring of liquid and gaseous media, such as propellants, pressurants, coolants, or life-support fluids, between space assets. In another aspect, the intent to use such a device is to facilitate robotic servicing or space assets.

In the satellite servicing industry, a non-cooperative satellite is a satellite that was not designed with on-orbit servicing in mind. Compared to a cooperative servicing interface, non-cooperative interfaces pose unique difficulties and challenges. While the CSV was designed to function with a robotic fuel transfer tool such as the existing SSCO Hypergol Refueling Tool (HRT) and hydrazine and xenon media, the architecture and approach is extensible to all space assets that could potentially be fueled/re-fueled, or require replenishment of other media, both gaseous and liquid, on and off the ground, including but not limited to manned crew vehicles, planetary rovers, and space habitats.

The solution is extensible to spacecraft propellants, pressurants, and other media beyond hypergolic fuels. It can be used in the delivery or receipt of media. The CSV leverages technology development from SSCO's Robotic Refueling Mission (RRM) and Remote Robotic Oxidizer Transfer Test (RROxiTT) and other studies to address the need to refuel a satellite on-orbit as a means of extending the satellite's operational life.

The CSV offers various advantages to standard service valves, with three individual and sequentially actuated seals, a self-contained anti-back drive system, and built-in thermal isolation. When mounted to a spacecraft as designed, the CSV is capable of managing all operational and induced robotic loads. The CSV interfaces with the robotic fuel transfer tool, which is actuated by an end effector, which in turn is mounted on a dexterous robotic arm. The CSV interface allows for direct coupling of the robotic fuel transfer tool such as the HRT without the removal of other extraneous parts or hardware in order to ready the interface. While the primary interface is the robotic fuel transfer tool, the design could be adapted to work with the industry standard 37 degree flared fitting, but as has been discussed, this would be disadvantageous for robotic servicing due to the increased risk of servicing task failure associated with engagement and disengagement of threads. The tool side of the interface can also be mimicked for ground-based manual actuation of the valve, as has been done with the SSCO Ground Connector for CSV (GCC). The current design has been analyzed for a maximum expected operating pressure (MEOP) of 650 psig for use with hypergols, and a MEOP of 5000 psig for use with pressurants or gaseous propellants.

The CSV has also been designed to adhere to current ground and flight range safety standards established in S-080-1998, ANSI/AIAA Space Systems—Metallic Pressure Vessels, Pressurized Structures, and Pressure Components, and AFSPCMAN-91-710, Volume 3, Air Force Space Command Manual 91-710 Volume 3: Range Safety User Requirements Manual Volume 3—Launch Vehicles, Payloads and Ground Support Systems Requirements.

The high level objectives of the CSV are as follows: 1. Deliver a means to transfer propellant, pressurants, and other media from a satellite servicing spacecraft to the client spacecraft, 2. Design a robotically cooperative fueling interface, 3. Provide integral two fault-tolerant sealing capability when closed, single fault-tolerant sealing capability when engaged to the robotic fuel transfer tool and opened, 4. Accommodate maximum expected operating pressure of 650 psig for hypergols/5000 psig for pressurants, 5. Demonstrate capability of reacting standard operational torques and forces, whether robotic or human, through the structure via proper mechanical coupling, 6. Provide built-in thermal isolation from the spacecraft bus structure, 7. Offer surface area for active thermal heating control, 8. Provide visual alignment marks/aids for robotic operations, 9. Demonstrate compatibility with being opened and closed in-orbit or on the ground, 10. Maintain a similar envelope and mass to existing FDVs, 11. Prevent inadvertent/unintentional actuation (opening) of the valve, and 12. Allow for on-the-ground refurbishment of the valve.

The concepts disclosed herein cover any design with three integral seals all operated via one set of actuations. The actuations can be from one command, or a sequence of commands through one interface. When closed, the system is two fault tolerant on its own, without the aid of externally assembled components. This improves the ability of the system to prevent leakage. Having separate externally assembled components can enable a change in form, fit, or function that is used to actuate the CSV, while maintaining the two fault tolerance independent of those components. Further, the two fault tolerance is achieved without requiring the main interface from being changed in order to accommodate a different form, fit, or function.

Additionally, although not addressed here, the client spacecraft must provide certain accommodations in order to maximize the CSV's compatibility with robotic servicing, including the following: 1. The CSV must be located within the reach and access envelope of the robotic arms of the servicing vehicle, 2. The spacecraft must provide a cooperative access blanket (if blanketing is required) to meet environmental loads, and 3. The spacecraft must provide appropriate clearances surrounding the CSV to meet worksite vision and access requirements.

One embodiment of the CSV features a standard tube (either bare tube or with a standard 37° flared-end fitting) that is connected to a body. This body houses a stem which moves axially along a set of splines in the body. The stem includes a piston-operated gasket-based primary seal which is opened and closed during the axial translation of the stem. The stem also creates the secondary seal via a metal-to-metal seal reacted against the body. The stem features a number of radial fluid paths upstream of the secondary seal for the transfer of media from the supply upstream to the tank downstream. Upstream of these fluid paths is a micro filter which is held in place by a poppet guide. This poppet guide allows for axial translation of a poppet which is biased close by a spring creating a check valve. This poppet engages a gasket-based seal, generating the tertiary seal of the CSV.

BRIEF DESCRIPTION OF THE DRAWINGS

FIG. 3A illustrates a top view of the Cooperative Service Valve mounted on a fixture plate;

FIG. 3B illustrates a side view of the Cooperative Service Valve mounted on the fixture plate;

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

A system, method and computer-readable media are disclosed which describe a Cooperative Service Valve (CSV)

Figure 1:
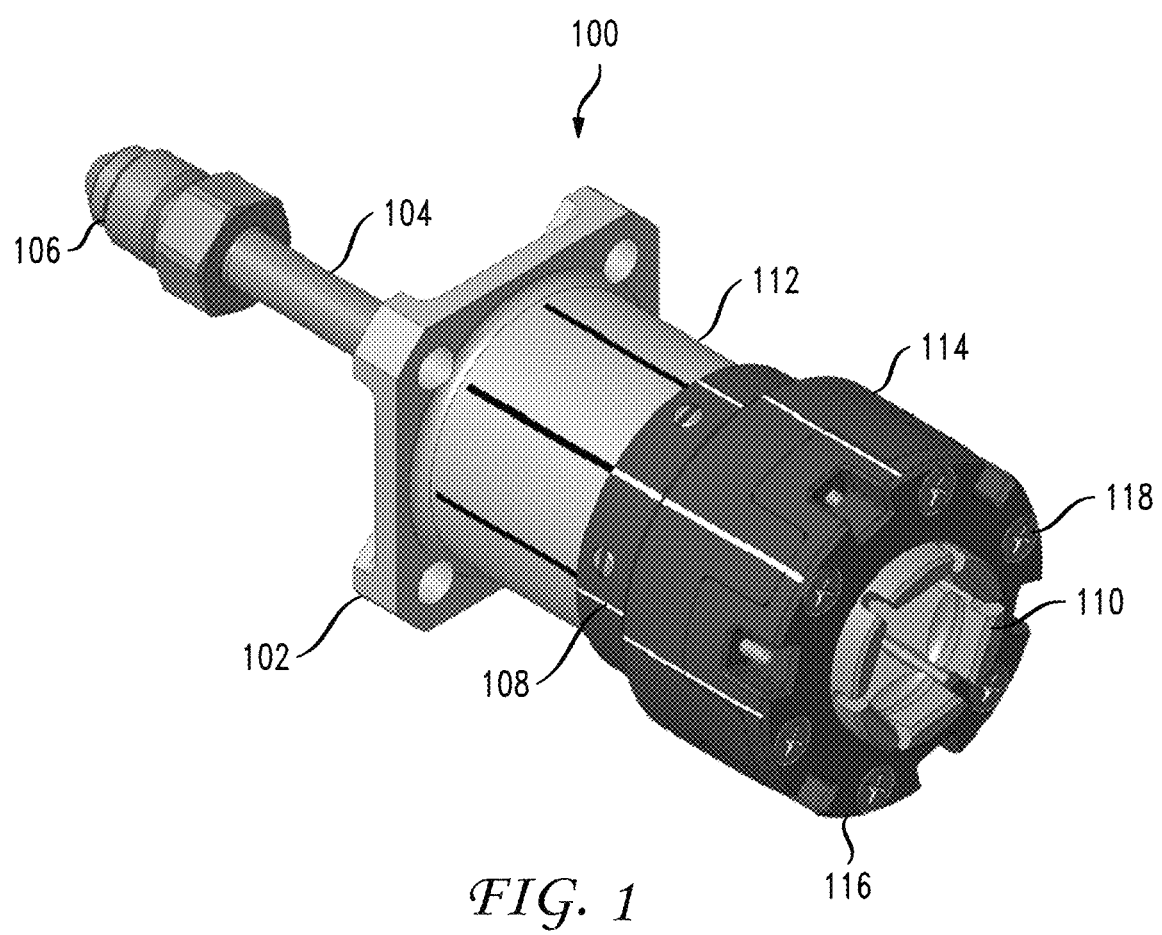
FIG. 1 illustrates an overview of a Cooperative Service Valve.

100 shown in FIG. 1 that is used for refueling a client device such as a satellite or other device. The CSV can also be used for providing robotic and human compatible transfer of liquid and/or gaseous media, such as propellants, pressurants, coolants, or life-support fluids. Thus, any media can be communicated to the client device using the CSV structure disclosed herein. The CSV can be termed a media delivery tool in a broader sense. The purpose of the CSV 100 is to facilitate tele-robotic operated, in-orbit refueling of a cooperative satellite. This iteration of the CSV is designed for interfacing with and actuation by the robotic fuel transfer tool 402 (see FIG. 4), but the disclosure can be adapted to function with other interfaces, and with other media at various operating pressures. The CSV can replace a standard client fill and drain valve (FDV) or supplement existing plumbing to facilitate cooperative servicing. The CSV has three integral seals which are opened by one of the robotic fuel transfer tool's drives. An anti-back drive mechanism, shown in FIG. 8, prevents the CSV seal mechanism from inadvertent actuation and is disengaged when the robotic fuel transfer tool is mated to the CSV. Alignment marks, thermal isolation, and a mechanical coupling capable of reacting operational and robotic loads optimize the CSV for tele-robotic operations.

The robotic fuel transfer tool 402 is actuated by the NASA SSCO Advanced Tool Drive System (ATDS), which is an example of a robotic end effector, and is mated to a fuel source line. The fuel line allows propellant to be transferred from the servicer propellant transfer assembly into the robotic fuel transfer tool 402, and then into the client spacecraft via the CSV 100.

Along with incorporating the CSV, other criteria need to be met by the cooperative satellite, such as location of the CSV with respect to the servicer grappling point, a cooperative access blanket (if required), and clearances surrounding the CSV to allow access of the worksite by a robotic arm on the servicing vehicle. Those details are not addressed herein, which only addresses the specifics of the Cooperative Service Valve.

FIG. 1 shows the Cooperative Service Valve 100. The Cooperative Service Valve is designed to be installed on a satellite or other device to provide an improved servicing capability. The Cooperative Service Valve 100 includes a mounting flange 102 which enables it to be mounted on to the client satellite structure 302. On the interior side of the satellite is a tube 104. The tube provides the interface between the CSV and the satellite media plumbing, and can be characterized for this iteration as a ¼" tube that can protrude a distance into the satellite from a mounting position. For example, it can protrude in 1 to 2 inches from the interior surface of a mounting panel. A fitting 106 can be a standard fitting such as a size 4, 37° flared fitting, or any other standard fluid/gas fitting that would be readily recognized by those skilled in the art. While the intent is that the fitting 106 is used for testing prior to integration, it is configured such that it may be removed prior to integration into a satellite's plumbing to allow for welding rather than a mechanical fitting.

Figure 5:
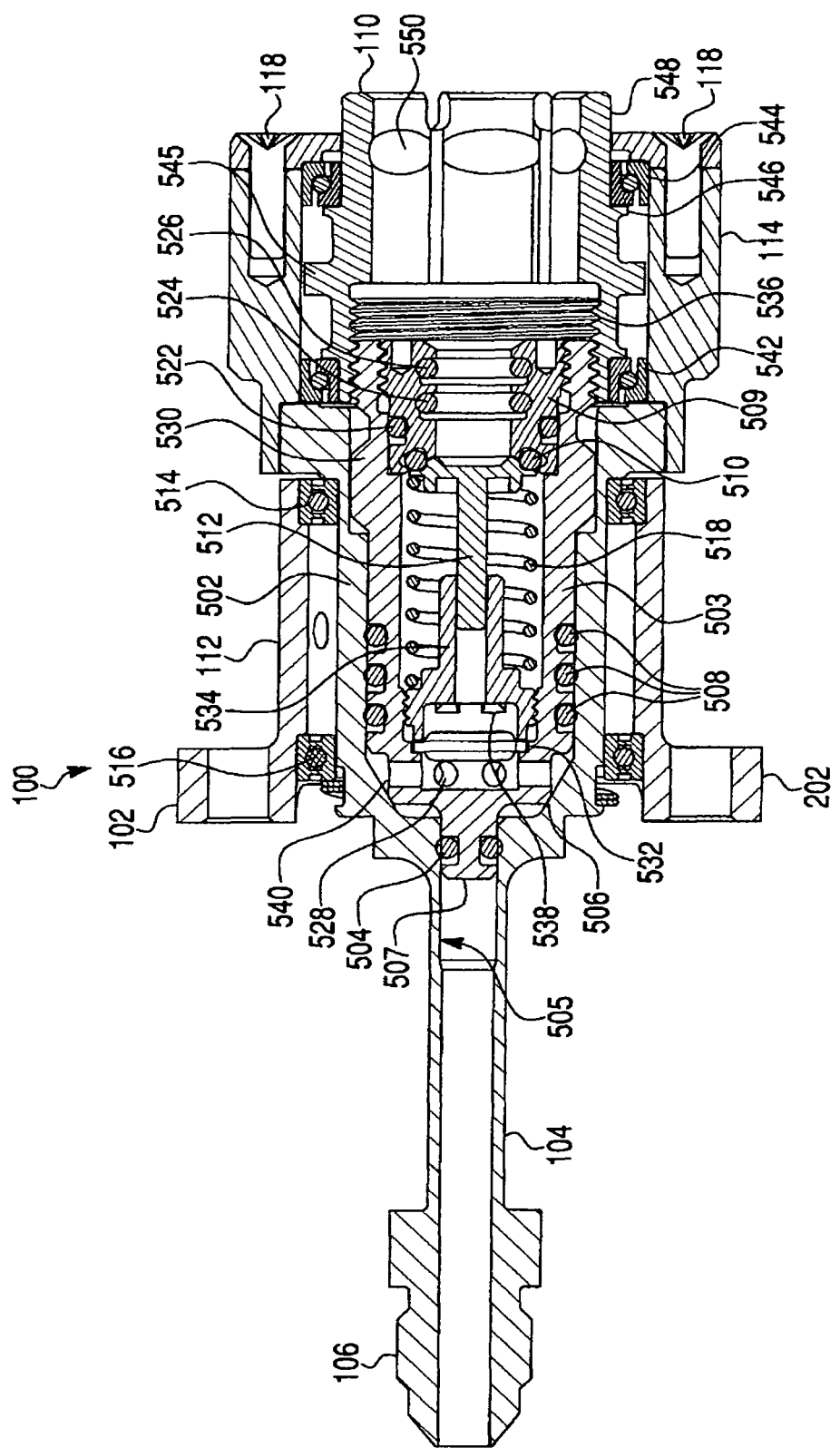
FIG. 5 illustrates an overview of the interior of the Cooperative Service Valve.

Most FDVs have and can provide a surface for limited thermal heating control. Active thermal control is often required in order for the valve to meet thermal survivability requirements imposed on the interface due to environment and the fluid in the system. The standard method for mounting FDV's for thermal isolation provides a non-optimal mechanical coupling to the spacecraft structure which does not permit proper coupling of operational loads, robotic or manual. FDV's can be mounted on thermal spacers to improve isolation, but the fasteners securing them to the structure are typically tightened to very low torsional values in order prevent crushing of the thermal spacers. There are features in the CSV that overcome this obstacle. FIG. 3B illustrates the CSV in its optimal mounting configuration, where it is directly bolted onto the surrounding structure. FIG. 5 shows how the CSV achieves thermal isolation. The valve body 502 utilizes support bearings 516 to limit thermal flow to the mounting flange 112, allowing the mounting flange to be coupled mechanically to the spacecraft structure with high stiffness and preload. The bearings 516 behave as thermal isolators due to the low thermal conductance they provide between the mounting flange 112 and the valve body 502. The valve body 502 utilizes a torsional resistance feature. In this embodiment, a square 10X shown in FIG. 2C, engages the surrounding structure and permits the reaction of torsional operational loads imparted on the CSV when opening or closing the seals.

The exterior of this iteration of the CSV consists of multiple housings, a mating interface for the robotic fuel transfer tool, and the previously mentioned tube 104. A service valve outer body 112 is configured to be attached directly to a structure 302 via four bolts threaded into the mounting flange 102 via respective female threads (four 0.190-32 UNF-3B threads in this iteration). The outer body 112, while being mechanically coupled to the satellite structure 302, in turn couples to the valve body 502 itself via standard radial bearings 514 and 516. For this iteration, the bearings 514 and 516 provide mechanical grounding while providing a thermal open-circuit in order to isolate the valve portion of the CSV from the satellite structure. This disclosure covers the concept of mechanical coupling with optimized thermal isolation in order to permit all robotic and manual operational loads to be reacted into the spacecraft structure through the CSV.

Thermal isolation of the CSV from the surrounding satellite structure 302 is achieved through the use of two distinct methods. The first method is minimizing the contact surface area between the CSV mounting flange 112 and the surrounding satellite structure 302 by the use of local stand-offs 202 on the mounting flange 112. This method reduces the thermal conductance across the interface. The second approach utilizes the standard radial bearings 514 and 516 mentioned above. Bearings are poor thermal conductors, and their thermal behavior can be manipulated by changing the number of bearing balls and the lubricant. Dry bearings with fewer bearing balls offer less thermal conductivity than lubricated bearings with a full complement.

An anti-back drive housing 114 is attached to one end of the valve body 502. A cover 116 is configured to attach to the anti-back drive housing and contain a hex-drive interface 110. The hex-drive interface 110 is configured to secure a refueling tool such as a robotic fuel transfer tool 402 or similar tool. The hex-drive interface can secure the refueling tool via a toroidal cut, the circumference of which forms a pattern of grooves 550 radially disposed about the centerline of the hex-drive interface 110, intersecting the flat walls therewith and oriented suitably to accept a protruding element, such as a ball 408, from the inserted male hex, in such a way as to lock the male and female elements in substantially rigid coupling when the ball(s) are positioned to engage the corresponding grooves. Typically, through robotic operations in space or on the ground, a tool can be inserted into the hex-drive interface 110 to provide fuel transfer. Screws 118 are used to secure the cover 116 to the anti-back drive housing 114. The drive housing 114 is secured to the valve body 502 with shoulder screws 702. The shoulder screws 702 fit into a groove machined into the valve body 502. The shoulder screws 702 secure the drive housing 114 thereto in such a way as to restrict axial motion but permit rotational freedom. Alignment indicators 108 are shown both on the outer body 112 and on the anti-back drive housing 114 as well as cover 116. These can be used to guide the interaction between a ground connector, such as the GCC, or robotic fuel transfer tool into its interaction with the CSV 100.

The alignment guide cutouts in the hex drive interface 110 establish rotational alignment between the robotic fuel transfer tool male hex prior to insertion of the hex into the hex-drive interface 110. The alignment guide cutouts are also the reason why the hex-drive interface 110 stands proud of the surface of the cover 116 most distal to the mounting flange 102.

Figure 2C:
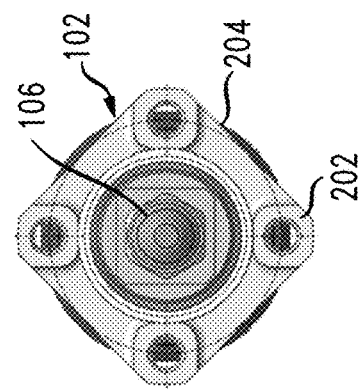
FIG. 2C illustrates a bottom view of the Cooperative Service Valve.
Figure 2B:
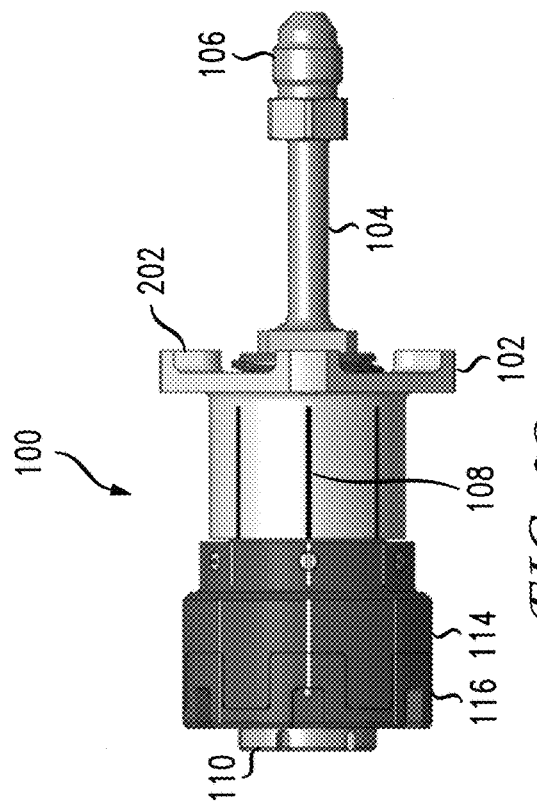
FIG. 2B illustrates a side view of the Cooperative Service Valve.
Figure 2A:
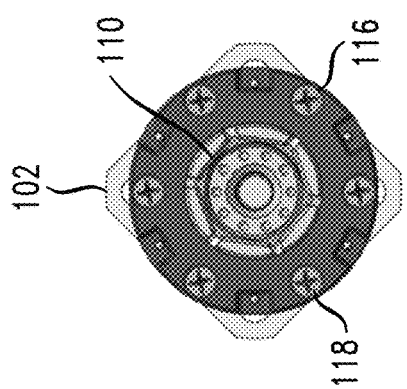
FIG. 2A illustrates a top view of the Cooperative Service Valve.

FIGS. 2A-2C illustrate different views of the CSV 100. FIG. 2A illustrates a top view in which the interior of the hex-drive interface 110 is shown. The screws 118 are shown as well as a portion of the mounting flange 102.

FIG. 2B illustrates a side view of the CSV 100 in which the various components are also shown. The underside 202 of mounting flange 102 represents the surfaces which will interface with a mounting plate (e.g., 302). FIG. 2C illustrates the view from the bottom of CSV 100. The flared fitting 106 is shown as well as the surfaces 202 of the mounting flange 102. The callout number 202 represents all four faying surfaces shown in FIG. 2C. Note that the surfaces 202 maintain a smaller contact surface area in order to provide one means of inhibiting thermal bonding between the CSV 100 and the satellite structure 302. The CSV does not need a backing wrench to be operated.

FIG. 3A illustrates a top view of the CSV 100 as it is mounted to the satellite structure, mounting plate, or other fixture, shown generically as 302. Alignment marks 304 are shown which are configured on the plate 302. The interior of the hex-interface 110 is also again shown.

FIG. 3B illustrates a side view of the CSV 100 mounted on the plate 302. This view provides an image of how the CSV 100 appears when mounted. Note that the CSV is designed to be directly mounted onto the plate in order to properly react loads. Thermal isolation is achieved through other means, described subsequently in this disclosure, rather than by use of spacers made from thermal isolating materials, which would nominally be mounted between surfaces 202 and 302.

Figure 4:
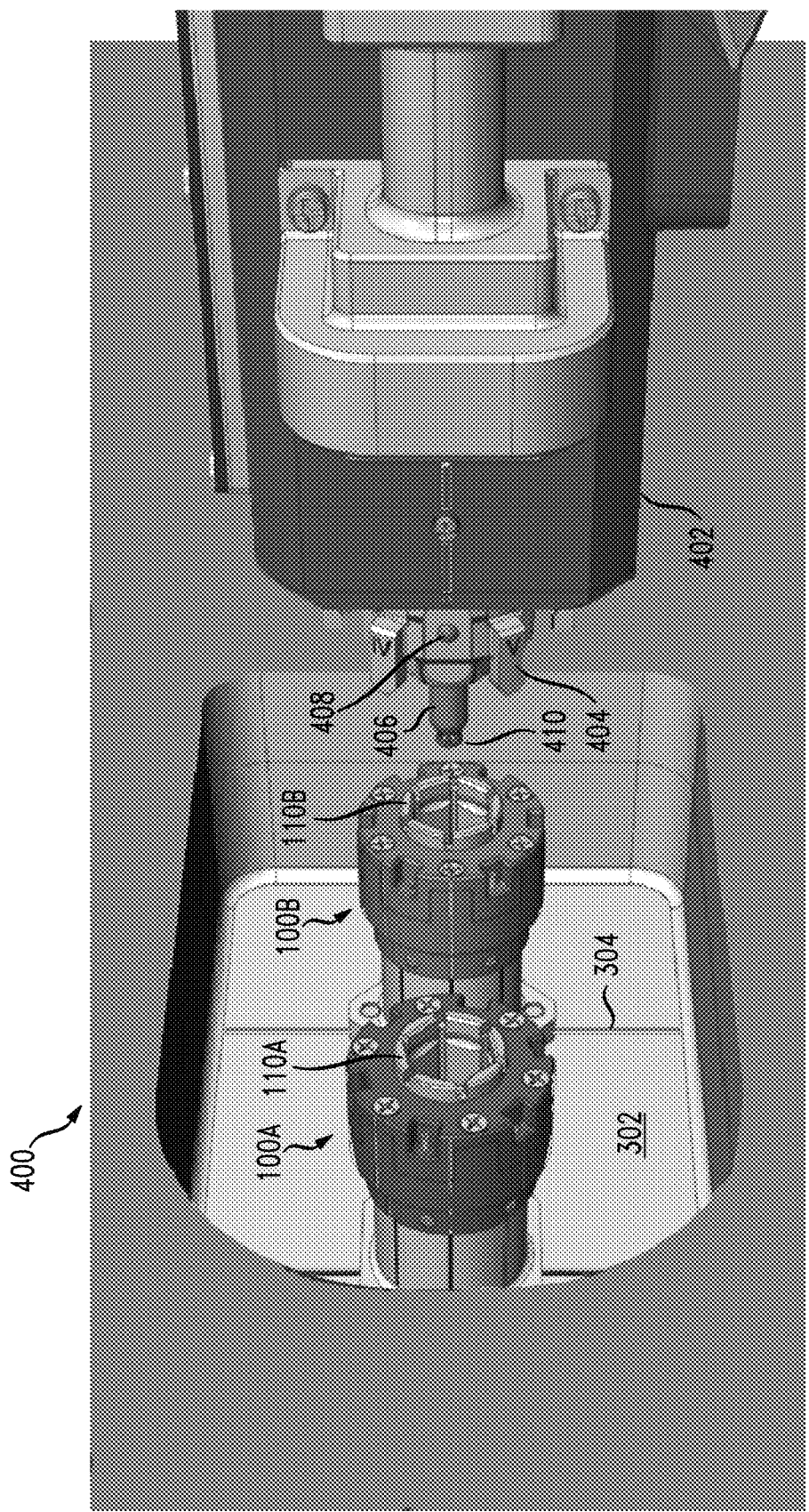
FIG. 4 illustrates two Cooperative Service Valves and a robotic refueling tool.

FIG. 4 illustrates another mounted configuration 400. Two CSVs are shown 100A, 100B. Mounting plate 302 is shown as being in a recessed region containing the two CSVs 100A, 100B. Labeling and different housing colors can be used to identify different CSVs for different media. For example, one type of fuel may be used for CSV 100A and another CSV 100B may be provided with a different type of fuel, oxidizer, pressurant, etc. Guide alignment markers 304 are shown to assist in robotic alignment. Each respective CSV 100A, 100B has a similar corresponding hex-interface 110A, 110B. In the embodiment depicted in FIG. 4, the CSVs 100A, 100B are recessed 1-4 inches below a honeycomb panel outer surface. A tool 402, for example a robotic hypergol refueling tool (HRT), may be introduced to the CSVs 100A, 100B, said tool 402 having a fuel line nozzle 406 and various structures for interfacing with the CSVs. For example, coupling 404 and a locking ball 408 can be used to interface and secure interaction between the tool 402 and the CSVs 100A, 100B. Feature 410 represents openings at the end of the nozzle 406 to enable fuel to flow as shall be explained below.

FIG. 5 illustrates a cutaway of the CSV 100 providing details of the various components. The tube 104 through fitting 106 is the means by which the CSV interfaces to the fluid-carrying sections of the spacecraft propulsion system or other plumbing systems as described above (fitting 106 is used for testing and may be removed to permit for welding of the CSV to a satellite's plumbing). A valve body 502 is a structure that consists of the fitting 106, the tube 104 and an expanded portion which is configured to receive a stem 503. The stem 203 can axially translate to various configurations in order to enable safe refueling of the satellite. For example, at an interior surface 505 of the tube 104, there is a diameter configured to receive the piston end 507 of the valve stem 503 in such a fashion as to compress a piston seal 504, such as an O-ring, between the tube diameter 505 and a mounting gland provided within the piston 507. This provides a sealing surface to prevent the flow of media from the tube 104 into the other regions of the valve body 502 and the stem 503. The piston end 507 of the stem 503 is designed to selectively engage and disengage the primary seal 504 from the tube 104 interior surface 505 through rotational actuation of the hex-drive interface 110. An alternative embodiment of the invention features the seal mounting gland on the tube 104 interior wall 505 rather than on the piston end 507 of the stem 503.

Next, the valve body 502 contains an angular surface 540 which is configured to interface with an expanded portion of the valve stem 503, shown as feature 506. The interface between the surface represented by feature 506 of the stem 503 and the surface 540 represents a secondary seal which is a metal to metal seal. When surfaces 506 and 504 are brought into compressive contact, an alternate seal in addition to the primary seal 504 prevents the flow of media from the tube 104 to the exterior of the CSV 100. The stem 503 also contains additional seals 508. The preferred embodiment features three individual seals 508 which inhibit leakage between the valve body 502 and the stem 503 while permitting the stem 503 to be translated axially within the valve body 502. In another embodiment of this design, only two seals 508 are present. In the close configuration of the valve, these seals provide a tertiary, quaternary, etc. inhibit along a leak path after the metal to metal seal. In the open configuration, where metal to metal seal and piston seal 504 are disengaged, these same seals provide a primary, secondary, etc. inhibit along the leak path. It will be noted that an alternate number of seals can be included at this point. Similarly, seal 504 could also include another primary seal or two, the particular number of seals that are provided here is flexible. If there are more seals used than are shown in the figures, the more stroke would be needed for the CSV, which in turn would require lengthening the CSV. It is also important to note that in other embodiments of the CSV, such as a configuration for a pressurant where higher operating pressures are expected, the grooves for the O-ring seals can be expanded to accommodate backing-rings in order to accomplish proper performance at higher pressures.

Within the stem 503 are other components as well. A poppet guide 534 is configured to have several features. The poppet guide 534 is positioned within the stem 503 and has an interior opening that receives a poppet 512. The poppet 512 is biased in a closed position by a spring 518. The spring 518 seats the poppet 512 against a seal 510 creating a tertiary seal via a valve such as a poppet valve, which is a unidirectional valve which opens due to a mechanical action. A check valve could also be used, which would be passively actuated and would open unidirectionally due to a pressure delta across the valve. The seal 510 is contained within a second body 509 or seal retainer which is configured within an end portion of the stem 503. The second body 509 contains a number of seals including tertiary seal 510 which is designed to seal the poppet 512. Seals 524 and 526 are positioned on an interior portion of the second body 509 which, as shall be shown below, provide a primary and secondary seal when a fueling component is inserted into the CSV 100 and the CSV 100 is in the open configuration. Another seal 522 provides a seal between the second body 509 and the stem 503. In another embodiment, a crushable seal may be placed as an additional inhibit between the second body 509 and the valve body 503. In another embodiment, a metal to metal seal may be present between the second body 509 and the valve body 503. In another embodiment, a weld may be used to seal the second body 509 to the valve body 503. The outer housing 112 includes several bearings 514 and 516 which provide an interface between the outer body 112 and the valve body 502. The bearings also provide a separation for the purpose of inhibiting thermal energy from transferring between the outer body 112 and the valve body 502.

FIG. 5 also includes bearings 542 and 544 which provide an interface between the anti-back drive housing 114 and the hex-drive interface 110. An anti-back drive ring 545, featuring a pattern of radially distributed scallops, is received within the anti-back drive housing 114 and is configured, via the bearings 542 and 544, to rotate with respect to the housing 114. Shoulder screws 118 are used to secure cover 116 to the anti-back drive housing 114. An interior surface 550 of the hex-drive interface 110 is used to interact with and secure whatever tool is inserted into the hex-drive interface through the use of a locking ball 408 or other similarly configured feature. The hex-drive interface 110 converts rotary movement, via the thread 536, to linear movement of the stem 503 to open and close the seals that are disclosed herein.

Radial fluid passages 528 are shown in a portion of the structure of the stem 503 which, when the CSV 100 is fully open, allows media to flow through the stem and into the tube 104 as shall be explained below. Axial fluid passages 538 are also provided in a portion of the poppet guide 534. The fluid passages can provide a fluid flow pathway through the internal stem structure. Media passes through a filter 532 as it flows through the stem 503 and into the satellite. The filter is positioned within the stem 503 via a filter holding structure as is shown. The poppet guide 534 is threaded into the valve stem 503 to retain the filter in place.

Figure 6:
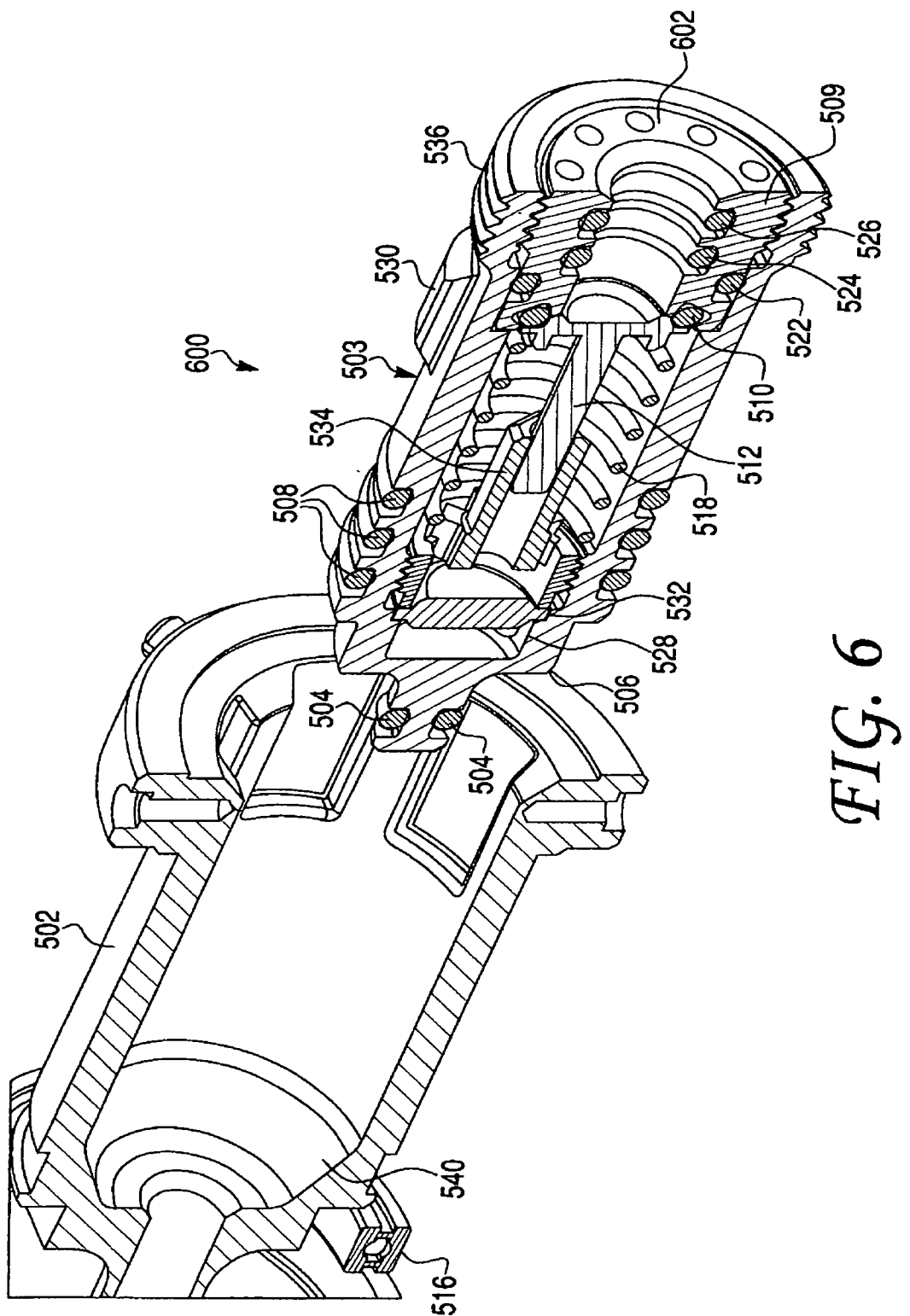
FIG. 6 illustrates the stem details of the of the Cooperative Service Valve.

FIG. 6 illustrates another view of the valve body 502 and the stem 503. Surface 540 is also shown which again is designed to provide a secondary metal to metal seal between the valve stem 503 and valve body 502 when the sealing surface 506 of the stem 503 is brought into compressive contact with surface 540 through rotation of the hex-drive 110 and the resulting axial displacement of the stem 503.

On the stem 503, the various seals 504, 508, 510, 522, 524, and 526 are shown. In this embodiment, the spring 518 seats the poppet valve 512 against the O-ring 510 to generate a seal. Any seal disclosed herein can refer to or be structured to be any kind of seal, such as an O-ring seal, lip seal, metallic seal, or spring-energized seal. Drive threads 536 are also disclosed which are typically designed to close the CSV in a clockwise direction and open the CSV in a counter-clockwise direction. The second body 509 is also shown with a feature for a spanner wrench 602 that can be seen in the various views. A spline 530 is designed to prevent rotation while allowing axial movement during rotation of the hex-drive interface 110. The valve body 502 is provisioned with a pattern of female spline teeth, disposed radially about the valve body 502 main axis and oriented parallel therewith. The female spline teeth receive a corresponding set of male spline teeth 530, disposed radially about the circumference of the valve stem 503 and oriented in similar fashion so as to permit the valve stem 503 to translate axially with respect to the valve body 502, while inhibiting relative rotation while the valve stem 503 is driven by the rotating hex-drive interface 110 In this manner, the sealing surfaces 506-540 witness only a linear compressive load and no relative rotation during sealing.

Figure 7:
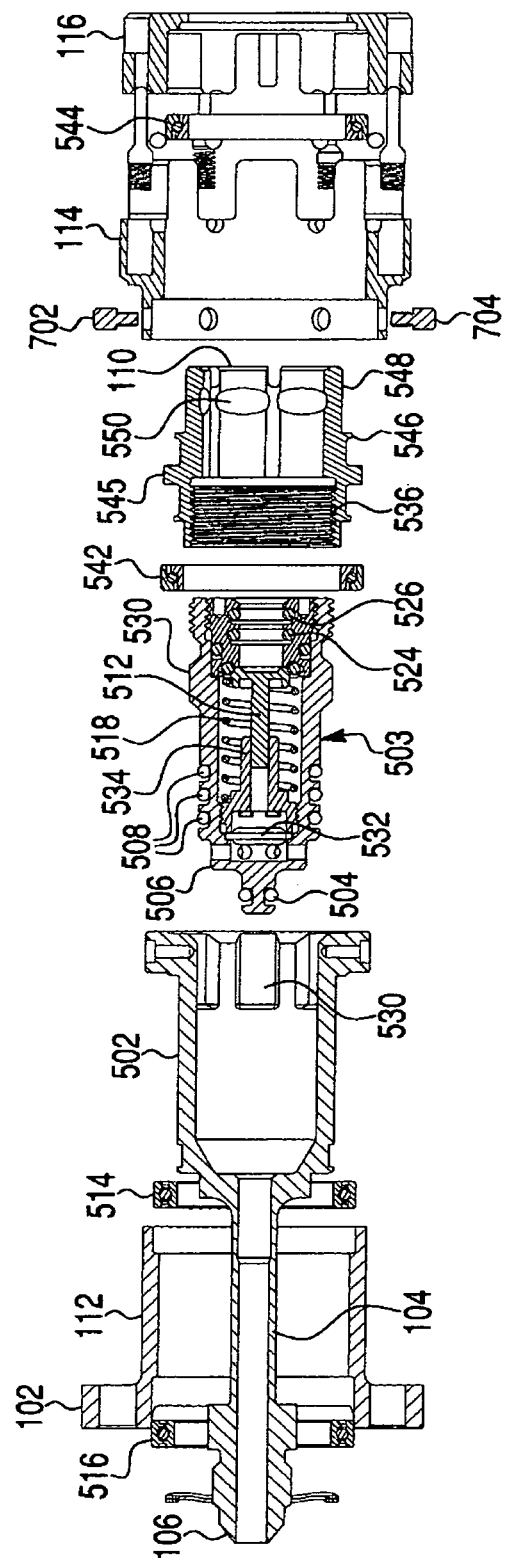
FIG. 7 illustrates the further details of the outer body, first body, stem, hex drive, anti-back drive housing and other components of the Cooperative Service Valve.

FIG. 7 illustrates an exploded view of the outer body 112, the valve body 502, the stem 503, the hex-drive interface 110, the anti-back drive housing 114 and the cover 116. Shoulder screws 702, 704 are provided to fasten the anti-back drive housing 114 to the valve body 502. The method in which the anti-back drive housing 114 is secured to the valve body 502 permits for full disassembly of the CSV's 100 sealing components, even after the tube 104 of the valve body 502 is welded to the satellite's plumbing.

Figure 8:
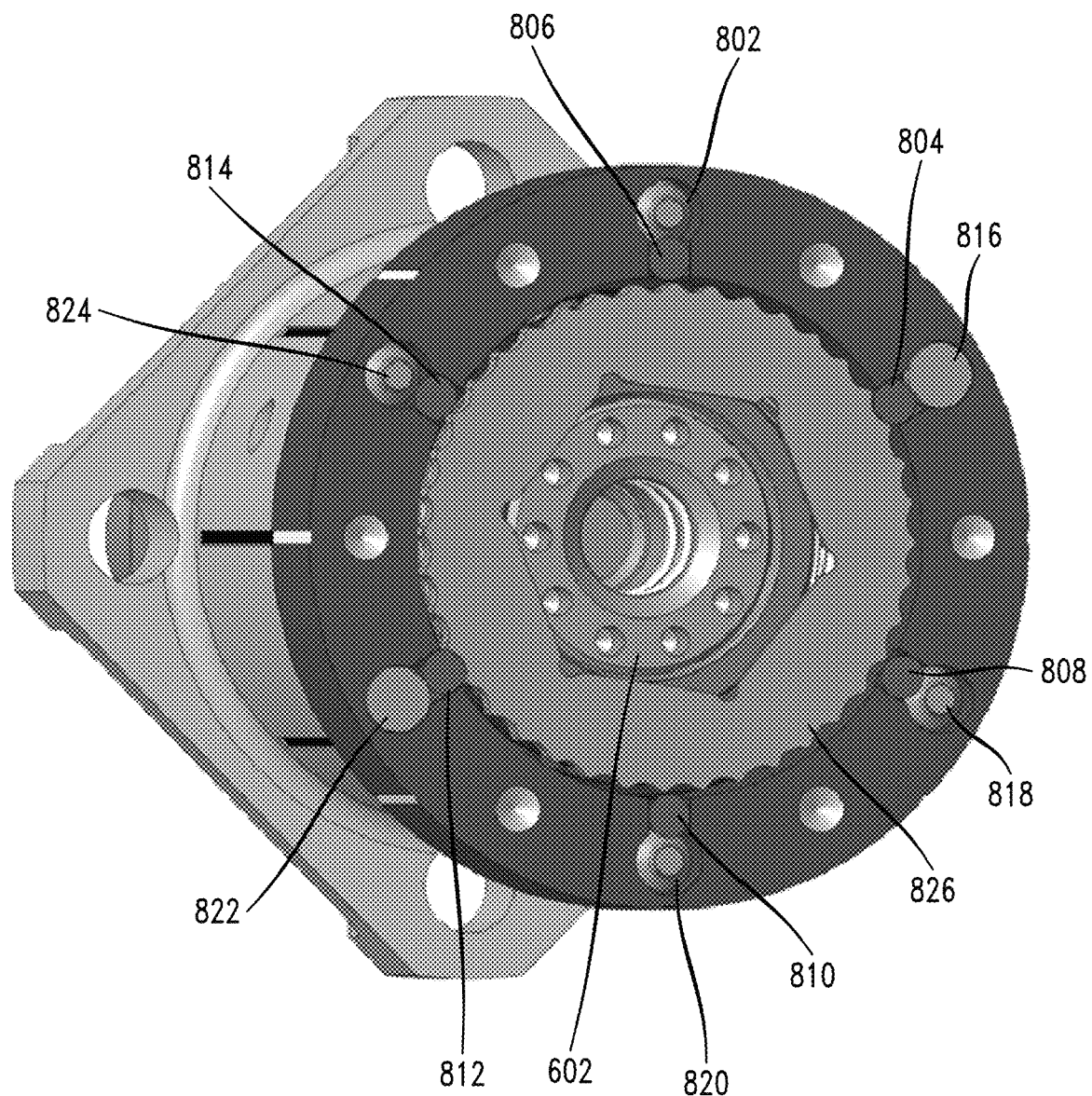
FIG. 8 illustrates the anti-back drive of the Cooperative Service Valve.

FIG. 8 illustrates the anti-back drive mechanism 800. A set of six plungers 802, 816, 818, 820, 822, and 824 resting on springs have the ability to bias a ball 806, 804, 808, 810, 812, and 814 against the locking ring 545 or 826, preventing the hex-drive interface 110 or 826 from being rotated. The locking ring 545/826 has mating detents for the balls every 9°; the plunger/ball pattern is disposed in circular fashion around the anti-back drive housing 114 at 60° increments. The result of the plunger/ball placement relative to the detent pattern is that a pair of balls, offset by 180° relative to each other, is available to engage the locking ring 545/826 at every 3° of rotation. As mentioned previously, the hex-drive interface 110 is rotated to disengage and engage the seals of the CSV 100.

The anti-back drive mechanism 800 is disengaged by the spanner wrench 404 of the robotic fuel transfer tool 402. The six plungers protrude from the cover 116 into recesses where the spanner wrench mates. When the robotic fuel transfer tool or similar interface is engaged to the CSV, the plungers are pushed into the anti-back drive housing 114 against the springs, which permits the balls 802 to displace radially outward from the locking ring 545/826, disengaging the locking ring 545/826, and thus allowing the hex-drive interface 110 to be rotated.

Ground-based closing of the valve would differ from in-orbit based closure of the valve. For ground closing of the CSV 100, the hex drive interface would be driven in a clockwise manner to the minimum torque required to ensure that the seals are properly seated. The anti-back drive mechanism 800 would be released by disengaging the spanner drive interface, and the hex drive would continue to be tightened (up to the maximum allowable torque) until one pair of plungers fully extend, indicating the anti-back drive mechanism is now locked. For in-orbit use, hex-drive interface 110 would be tightened to the maximum torque prior to disengaging the robotic fuel transfer tool 402 or similar from the CSV 100. If the CSV 100 were to back-drive, the plungers 802 will engage in less than 3 degrees of rotation, preventing loss of seal integrity. The materials chosen, the surface area of the contacting surfaces 506-540, the stroke over which the O-ring 504 remains engaged, the elastic stiffness of the valve stem 503 and valve body 502, and the pitch of the thread 536 are all selected such that a rotational deviation of the hex-drive interface 110 of 3° will not cause enough axial deflection of the valve stem 503 relative to the valve body 502 to result in unloading of the seal interface 506-540 nor release of the O-ring interface 504-505.

Figure 9:
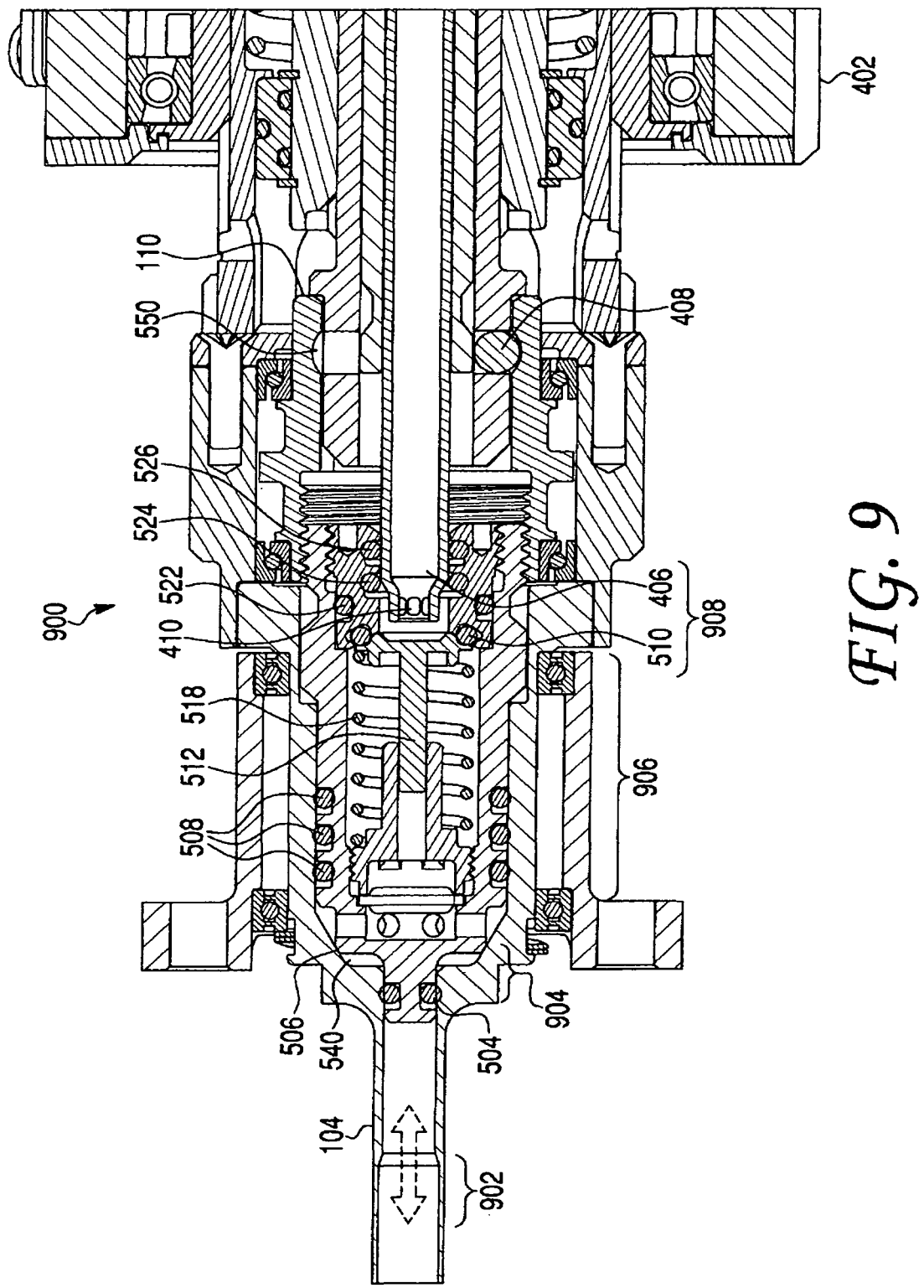
FIG. 9 illustrates the operation of the Cooperative Service Valve in a first phase of use as part of a refueling process.

FIGS. 9-13 will illustrate various stages of operation or modes for engaging the CSV 900 with a robotic fuel transfer tool 402 having a nozzle 406. In FIG. 9, robotic fuel transfer tool 402 is engaged and secured onto the CSV 900. The ball 408 fits into the mating groove 550 in the hex drive interface 110 of the CSV, thus preventing inadvertent withdrawal of the robotic tool 402 from the CSV 100 during fluid transfer. The CSV is shown with all three seals closed. At this stage, the pressure in a first region 902 of the tube 104 is at a high pressure, whereas the tool is at the surrounding ambient pressure, e.g. partial vacuum in a low-Earth orbit servicing scenario. The piston seal 504 and metal-to-metal seal 506 isolates region 904, which given a very low leak rate could be at the same pressure as region 902 after a sufficiently long period of time. The metal-to-metal seal 506 and the poppet valve seal 510 isolate another region 906, which could share the same characteristics as region 904 after a sufficiently long period of time.

The nozzle 406 of the robotic fuel transfer tool 402 is seen inserted into the CSV 100 sealing on one O-ring 526. The nozzle 406 however has not yet touched the poppet 512. At this stage, phase or mode, there is no media or pressure in a region 908

Figure 10:
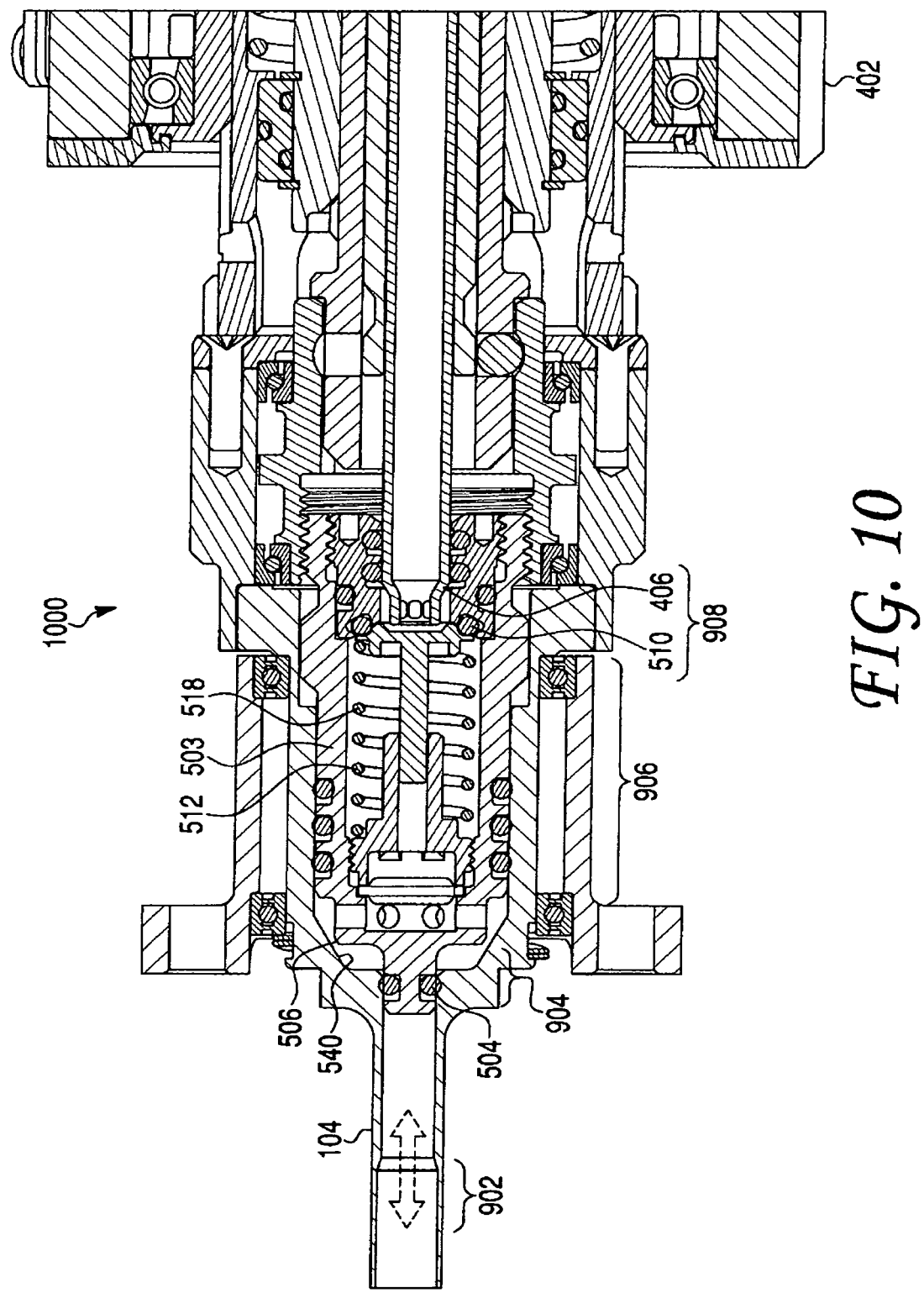
FIG. 10 illustrates the operation of the Cooperative Service Valve in a second phase of use as part of a refueling process.

FIG. 10 illustrates the CSV 100 in another step, phase or mode in the process of providing fuel to the satellite. The CSV hex-drive interface 110 has been rotated a sufficient amount to draw the valve stem 503 within the valve body 502 in order to break the metal-to-metal seal 506-540, allowing the pressures between regions 904 and 906 to equalize. Region 904 remains isolated because seal 504 still provides a primary seal that is closed. However, movement of the stem 503, while maintaining the seal 504, has opened the secondary seal between surface 506 and surface 540. Thus, in region 904, the pressure is equalized with region 906. The poppet valve 512 remains in sealed engagement due to the spring 518 acting to engage the face of the poppet 512 against seal 510. In region 908 and through the nozzle 406, the pressure remains at the external ambient pressure. The nozzle 406 of the robotic tool 402 is provisioned to displace axially relative to the tool chassis, allowing variability in the penetration of the nozzle 406 relative to the CSV 100. If the pressure differential is high, as is typical with gaseous pressurants, this phase could permit for the robotic fuel transfer tool to begin pressurizing region 908 and the nozzle 406, in order to lessen the differential pressure across the primary seal 504. A pre-open pressure equalization operation is desirable because it can prevent hammering or other dynamic pressure pulses upon full opening of the valve, which can damage upstream or downstream components of either the client plumbing system or the robotic tool. As region 908 is pressurized, the poppet valve will act as a check valve, causing the seal 510 to crack due to overwhelming of the poppet spring 518, which will permit high pressure to transfer from region 908 to regions 906 and 904.

Figure 11:
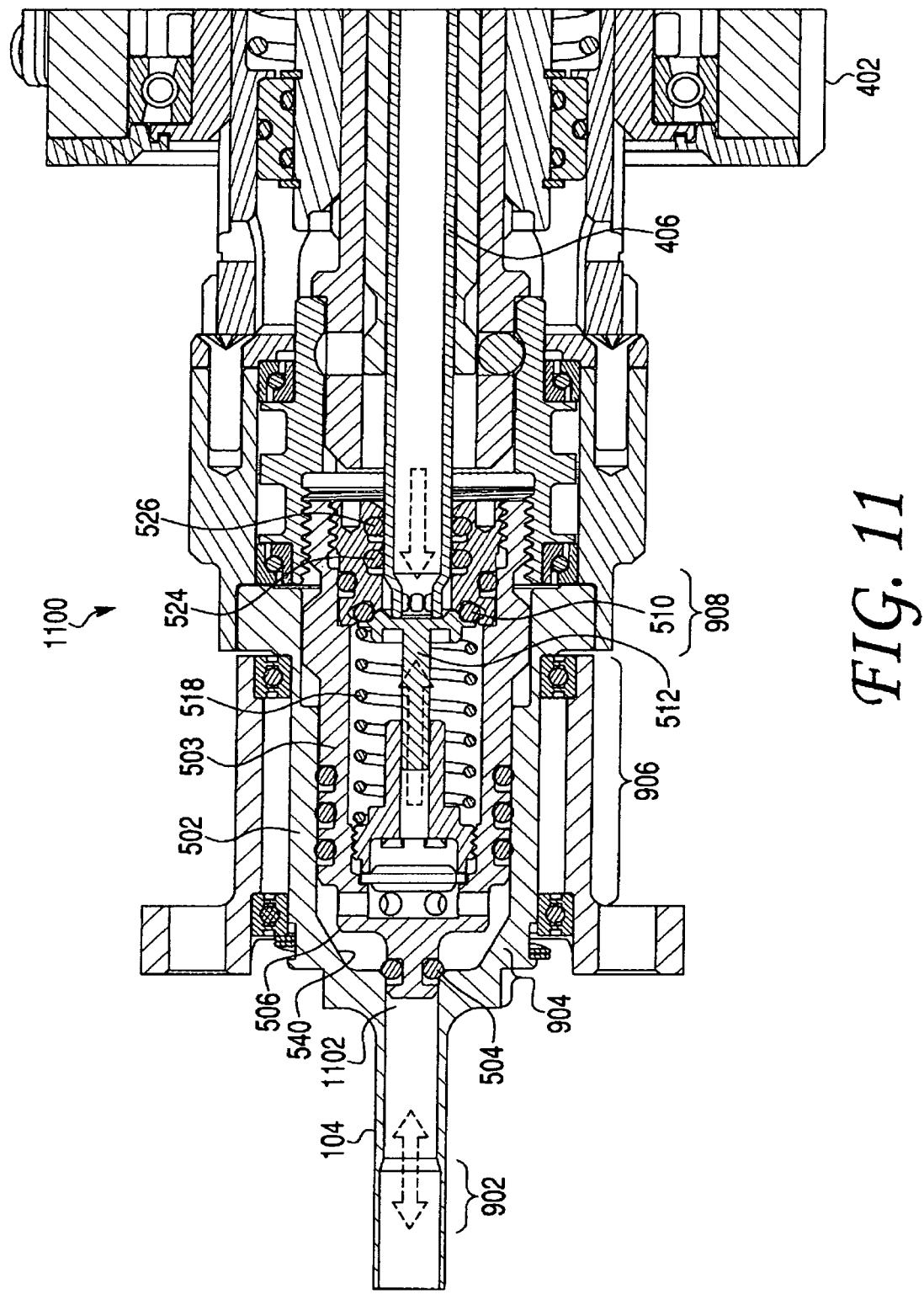
FIG. 11 illustrates the operation of the Cooperative Service Valve in a third phase of use as part of a refueling process.

FIG. 11 illustrates another phase of the CSV 1100 which shows further movement of the stem 503 such that region 902 of tube 104 is equalized in pressure with region 904 of the body 502. This is because the additional movement of the stem 502 has caused the partial opening of the primary seal 504. As can be seen, surface 506 of the stem 503 is further separated from the surface 540 of the body 502.

At this stage, region 906 is equalized in pressure with region 902. The nozzle 406 has also come into contact with the poppet 512, beginning the process of raising the poppet 512 face from the seal 510 in order to permit media transfer. Note that the nozzle is not moving. The axial motion of the stem 503 toward the nozzle, due to rotation of the hex-drive interface and action of the thread, advances the poppet face toward the nozzle end. The nozzle seals 524 and 526 also fully engage the nozzle 406 prior to the poppet 512 being contacted. Next, region 908 in the robotic fuel transfer tool 402 can be pressurized if it has not already been done.

Figure 12:
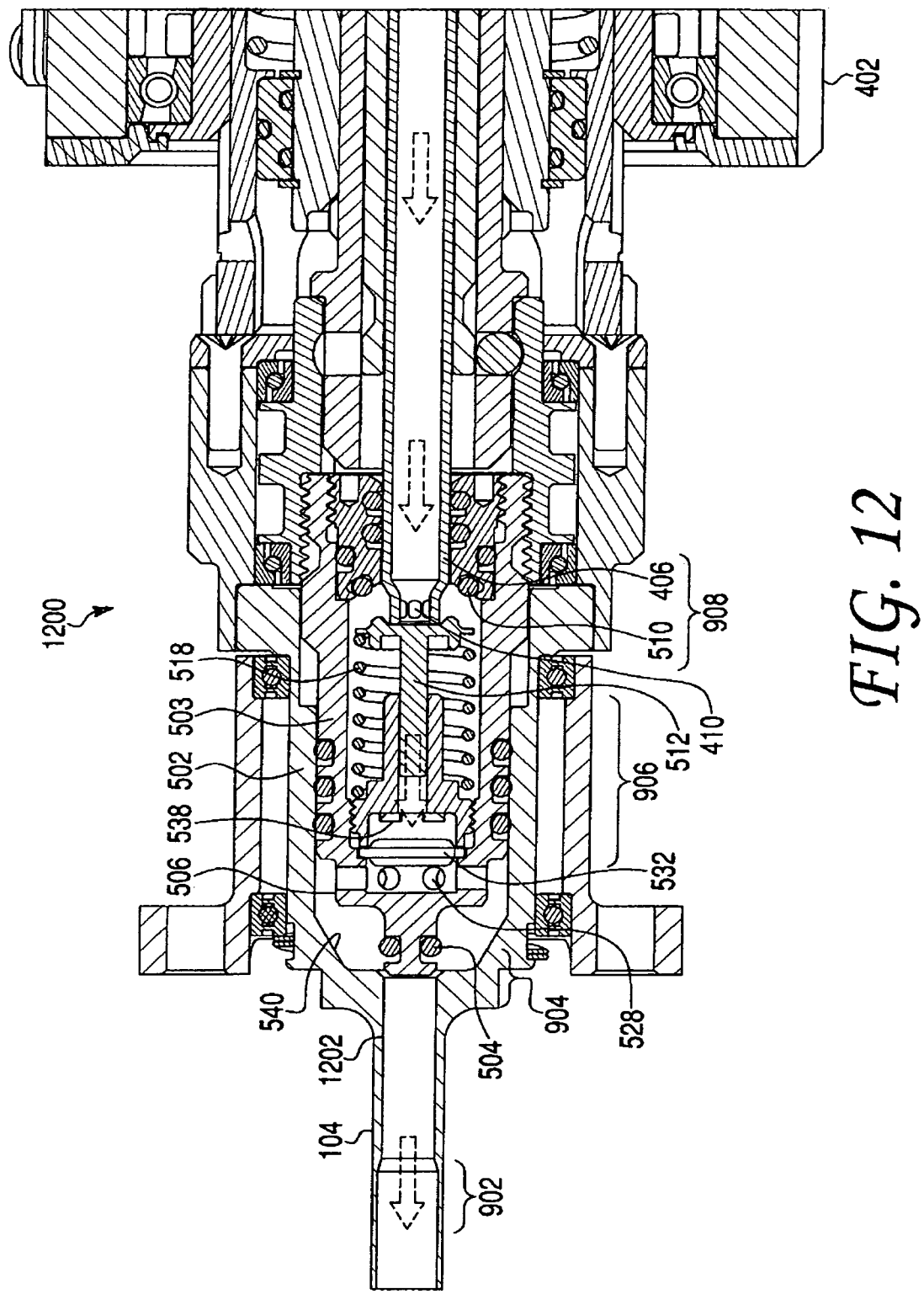
FIG. 12 illustrates the operation of the Cooperative Service Valve in a fourth phase of use as part of a refueling process.

After the pressure equalization shown in FIG. 11, FIG. 12 illustrates the CSV 1200 fully open and the robotic fuel transfer tool 402 in fuel transfer mode. Region 902 is fully open, the stem 503 is in a fully rightward position such that the piston seal 504 is fully open, the secondary seal between surface 506 of the stem 503 and the surface 540 of the valve body 502 is also fully open. Thus, the region 906 is fully open to permit fuel transfer. The poppet 512 has been opened by the nozzle 406 as the stem has moved rightward and the robotic fuel transfer tool 402 has remained stationary. Fuel can then flow from the nozzle through openings 410, around the poppet valve 512, through openings 538, through the filter 532, through openings 528, around the surface 506 and into the tube 104 which is connected to the receiving plumbing.

Figure 13:
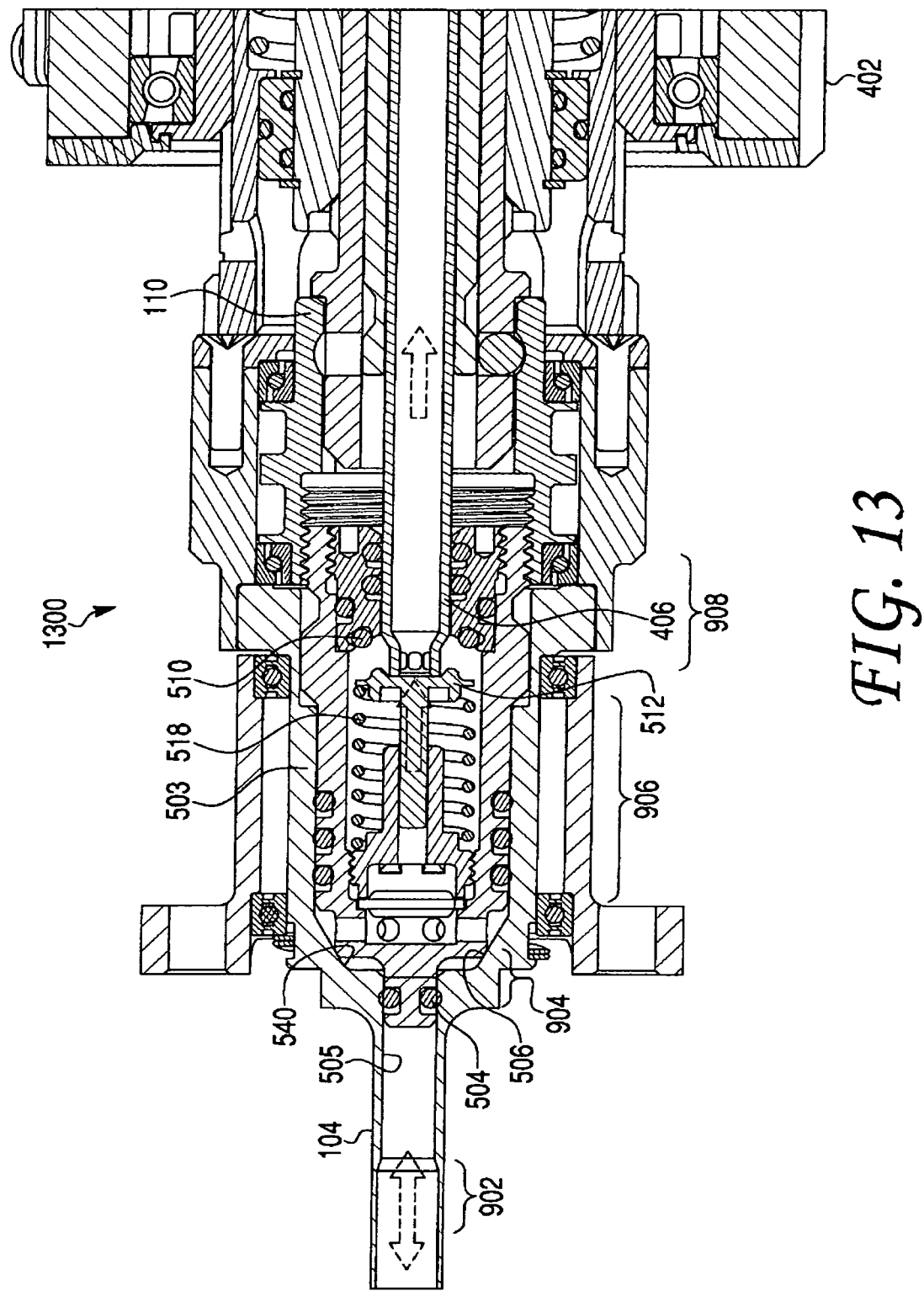
FIG. 13 illustrates the operation of the Cooperative Service Valve in a fifth phase of use as part of a refueling process.

FIG. 13 illustrates the operation of the Cooperative Service Valve 1300 in a fifth phase of use as part of a refueling process. Here, the piston seal 504 is sealed by virtue of the leftward movement of the stem 503, thus sealing region 902. The metal-to-metal seal surface 506 is still separated from surface 540 and thus region 904 is open to region 906. The nozzle 406 has been displaced axially with respect the robotic fuel transfer tool 402 such that the nozzle 406 is pressed against the poppet 512, permitting regions 906, 904, and 908 to be vented and the media evacuated from said regions. After completion of this step, the CSV 1300 can be fully closed. The nozzle 406 starts to be moved back out and away from the CSV 1300. The seal between the poppet 512 and the seal 510 is also shown as open as the nozzle 406 has not moved to the right a sufficient amount to enable the seal 510 to engage the poppet 512. Once the stem 503 moves leftward enough to seal region 904, and the nozzle 406 moves rightward enough to enable the poppet 512 to seal with O-rings 510, then the system will back to its original position. In other words, as the valve is closed and the stem 503 advances into engagement, the poppet seal is drawn away from the nozzle 406, allowing the poppet 512 to close on the seal and return the CSV 1300 to its original fully-closed state.

The functional operations described in detail above can also be described as a method. The method includes receiving in a CSV a nozzle from a refueling tool, the CSV including an interface, in this embodiment a hexagonal interface, that permits torque transfer, a tube connected to a valve body which contains a stem having a first seal and a second seal (and can have more seals as well), the stem including a poppet valve biased against a third seal by a spring, the stem furthermore including a nozzle seal for sealing the nozzle as it is inserted into the CSV. The CSV, with the robotic fuel transfer tool nozzle configured at least partially within the CSV, has 4 pressure regions: a first region 902 in the tube, a second region 904 in a first portion of the housing, a third region 906 within the stem contained within the housing, and a fourth region 908 within the nozzle of the refueling tool.

The method includes, in a first phase, moving the stem such that the region 904 pressure equalizes with the region 906 pressure. In the first phase, the region 902 pressure is maintained and region 908 exists at ambient external pressure. The equalization of pressure within region 904 and region 906 occurs due to a separation of a metal-on-metal seal between a surface of the stem 506 and an inner surface of the housing 540. Note that while a metal-on-metal seal is shown, any kind of seal can also be included. The method includes in a second phase, moving the stem such that the pressure in region 902 is equalized with the pressure in regions 904 and 906. This occurs when the stem is moved sufficiently that the first seal between a portion of the stem and the tube is at least partially opened. The method next includes pressurizing region 908 within the nozzle and starting a third phase in which the valve stem is moved which brings the poppet valve into contact with the nozzle 406, forcing it to displace from the seal 510 and expose region 908 to the pressure within the remaining regions. By opening the check valve 512 through contact with an end of the nozzle 410, this third phase can include providing media from the refueling tool to the client device through passing media from the nozzle through the stem into the tube.

The method includes a fourth phase of moving the stem back into a position such that the first seal 504 is closed and region 902 is at a high pressure, and region 904 and 906 are open. In this fourth phase, the region 908 initially has the same pressure as regions 904 and 906. But the nozzle 406 is then extended such that it vacates the Cooperative Service Valve and the refueling is complete.

Having discussed the structure and modes of operation of the CSV 100, the disclosure now addresses other features and benefits of the CSV. First, this disclosure addresses some key or unique characteristics, starting with corrosive media. The CSV is designed, but not limited to, the following working fluids: hydrazine (N2H4) per MIL-PRF-26536F, Grade M; monomethyl hydrazine (N2H3CH3) per MIL-PRF-27404D; dinitrogen tetroxide (N2O4) per MIL-PRF-26539F, type MON-3; helium per MIL-PRF-27407D, type 1, grade A; and xenon (99.99% or greater purity). From a hardware perspective, hypergols can react with many elements in such a manner as to create ignition upon contact. For other elements, they have deleterious effects on the material integrity, limiting the component's operational life and functional capability. To be universal, all material reactions must be considered in the design. The design approach for the CSV is to maximize compatibility of utilized materials with all working fluids in order to minimize changes in configuration due to the working fluids while also allowing for minuet configuration changes in order to optimize compatibility with specific working fluids associated for a configuration. This design approach permits the CSV to have the same form factor between configurations.

All materials, coatings, lubricants, and softgoods selected have a compatibility rating of A per NASA's Materials and Processes Technical Information System (MAPTIS) with the working fluids. For all configurations of the CSV, all metallic components and their coatings have been selected such that they have an A rating with all potential working fluids mentioned above. In this embodiment examples of materials utilized are titanium alloy 6AL-4V and coated with a conversion coating (Tiodize® Type II) and coated on selected surfaces with polytetrafluoroethylene impregnated conversion coatings, passivated stainless steels, and aluminum alloys coated in colored anodize. The primary differences between configurations of the CSV is the elastomers that are changed to optimize the compatibility rating with the associated working fluid and the use of backing rings for high operating pressures. Specific to the configuration of the CSV that utilizes hydrazine as its working fluid, components in the fluid path, or wetted components, will not utilize wet lubrication.

The robotic fueling interface is a cooperative interface that must be designed such that mating interfaces must accommodate the nuances of in-orbit, tele-robotic use. Some of these considerations are the use of proper lead-ins, use of low-risk mating interfaces, and misalignment tolerance in all directions (x, y, z, roll, pitch, and yaw). For example, low-risk mating interfaces can include such features as clear and unambiguous edges, high-contrast visible markings, ability for self-alignment, resistance to friction-wedging or stiction, and so forth. Another feature is seal redundancy. In order to be compliant with industry-standard ground-handling practices for hypergolic fluids, a Cooperative Service Valve can provide two fault tolerances to all leak paths on the ground and while in-orbit. Operating pressures are also very important. Given different pressure requirements for different propellant systems, a set of nominal operating pressures were chosen which should encompass most current client needs. For hypergol propellant transfers, a MEOP of 650 psig was chosen. For transfer of gases, such as helium and xenon, a 5000 psig MEOP was selected.

The system also needs to provide mechanical coupling between components. Tele-robotic operated interfaces are exposed to forces and torques along pitch, yaw, and roll different from those seen on a ground-based, hand-operated interface. These forces and torques include those caused by robotic loads as well as actuation loads required for the standard operation of the interfaces. A proper tele-robotic operated interface must provide adequate mechanical coupling to react all standard operational loads. Adequate mechanical coupling refers to couples to both the surrounding structure and back to the tool. The valve can be configured in such a way as to be able to react to all manipulation and operation loads without transferring those loads into the critical plumbing of the client spacecraft.

Most FDVs require thermal isolation from the surrounding structure in order to properly control temperature of the entire propellant system without thermally coupling to the surrounding mounting structure. The problem lies in that mechanical coupling and thermal isolation can result in mutual exclusivity, but a cooperative interface will require both in order to be viable.

Alignment marks can also provide an important component to the design. During tele-robotic operations, geometric features are used to provide alignment between robotic and client mating interfaces. When both sides of the interface are controlled, the preferred alignment features are lines built into the interfaces and of contrast with the surrounding surface so that they are clearly discernable using the remote vision system as feedback to verify proper alignment prior to engagement. The CSV provides various alignment marks along the valve body, located on surfaces at different radial distances from the main axis of the valve, but clocked such that they align at the same angle with respect to one another. These types of multi-surface alignment marks can greatly assist in the alignment of robotic interfaces when viewed through orthogonal cameras, permitting proper alignment to items with smaller surface areas.

The concepts disclosed herein can be used both in-orbit and on the ground. To be viable as a cooperative standard spacecraft fill and drain valve, this interface must be capable of being used on ground as well as in-orbit, either by a human or robot.

To be viable as a cooperative standard fill and drain valve, the interface must furthermore be of an envelope and mass comparable to those existing standard interfaces. For the specific case of the fueling interface, the relative size and mass of a Cooperative Service Valve must be comparable to those of FDVs. A FDV requires a means to prevent inadvertent disengagement of seals due to vibrational or environmental loads or inadvertent contact. During integration and testing, contamination, handling, and other sources of preliminary failure may cause a FDV to require servicing or cleaning of its interior components. Servicing may involve the swapping of failed components. Maintaining the ability to be serviced on ground through all phases of integration and testing would prevent having to discard a FDV, which may have been welded to a propellant line. The CSV is a separable assembly. In this embodiment, the removal of six screws 702 704 permits the anti-back drive assembly to be disassembled from the valve body, which then permits the entire stem to be removed from the valve body of the CSV. In this fashion, the stem and all of its integral O-rings can be serviced outside of the valve body. The CSV can be welded or integrated to the satellite's propulsion system, and this disassembly is still possible. FIG. 7 in the disclosure best illustrates this point. All components shown between the vale body 502 and the housing of the anti-back drive mechanism 114 can be disassembled by the removal of all six screws 702 704. The anti-back drive mechanism can be further disassembled by removal of another six screws 118.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A cooperative service valve comprising:
 a stem configured to fit within a valve body, the stem comprising:
  a stem first end having a first seal and configured to movably fit within a tube;
  a sealing portion connected to the stem first end and configured, in a first position, to provide a second seal between the sealing portion and an inner surface of the valve body;
  a fluid flow portion comprising openings for allowing fuel to pass through the cooperative service valve; and
  a stem second end configured to secure a poppet guide, a poppet and a spring associated with the poppet that biases the poppet against a seal to yield a third seal, wherein the stem further comprises a fourth seal configured to seal a nozzle inserted into the cooperative service valve.

2. The cooperative service valve of claim 1, wherein the valve body, and all components disposed within the valve body forming elements of the cooperative servicing valve exposed to fluid, are thermally isolated from a mounting structure of an outer body to which the cooperative service valve is affixed by means of un-lubricated ball bearings, the un-lubricated ball bearings serving as a poorly thermally conductive interface between the valve body and said outer body, which in turn is mounted rigidly to a surrounding structure.

3. The cooperative service valve of claim 1, wherein the valve body is provisioned with a surface between ball bearings which can accept an active thermal control device.

4. The cooperative service valve of claim 1, wherein all components of the cooperative service valve except for the tube and valve body may be disassembled, serviced, and/or replaced while the valve body and the tube are welded in place to a plumbing system at large.

5. The cooperative service valve of claim 1, wherein in a first mode:
 the first seal is sealed, the second seal is sealed, and the third seal is engaged.

6. The cooperative service valve of claim 5, wherein in a second mode, the stem moves such that:
 the first seal is sealed, the second seal is unsealed and the third seal is engaged.

7. The cooperative service valve of claim 6, wherein in a third mode, the stem moves such that:
 the first seal is unsealed, the second seal is unsealed and the third seal is engaged.

8. The cooperative service valve of claim 7, wherein in a fourth mode:
 the first seal is unsealed, the second seal is unsealed and the third seal is not engaged.

9. The cooperative service valve of claim 8, wherein in the fourth mode, fluid can flow through the cooperative service valve.

10. The cooperative service valve of claim 1, wherein the second seal is a metallic seal.

11. The cooperative service valve of claim 1, further comprising a filter positioned within the stem.

12. The cooperative service valve of claim 1, wherein in a fluid flow mode, the first seal is unsealed, the second seal is unsealed and the third seal is unsealed, such that fluid can flow through the stem by flowing around the poppet, through an opening in said poppet guide configured within the stem, through a filter, through the fluid flow portion of the stem, around the stem first end and through the tube.

13. A cooperative service valve comprising:
 a stem configured to fit within a valve body, the stem comprising:
  a stem first end having a first seal and configured to movably fit within a tube;
  a sealing portion connected to the stem first end and configured, in a first position, to provide a second seal between the sealing portion and an inner surface of the valve body;
  a fluid flow portion comprising openings for allowing fuel to pass through the cooperative service valve; and
  a stem second end configured to secure a poppet guide, a poppet and a spring associated with the poppet that biases the poppet against a seal to yield a third seal; wherein:
  in a first mode the first seal is sealed, the second seal is sealed, and the third seal is engaged; and
  in a second mode, the stem moves such that the first seal is sealed, the second seal is unsealed and the third seal is engaged; and
  in a third mode, the stem moves such that the first seal is unsealed, the second seal is unsealed and the third seal is engaged; and
  in a fourth mode the first seal is unsealed, the second seal is unsealed and the third seal is not engaged; and
 wherein the third seal is unsealed by the poppet being moved by a nozzle inserted into the cooperative service valve.

* * * * *